Nov. 26, 1929.   H. F. MERRIAM   1,737,320
CONTACT PROCESS FOR MANUFACTURING SULPHURIC ACID
Filed Dec. 17, 1927
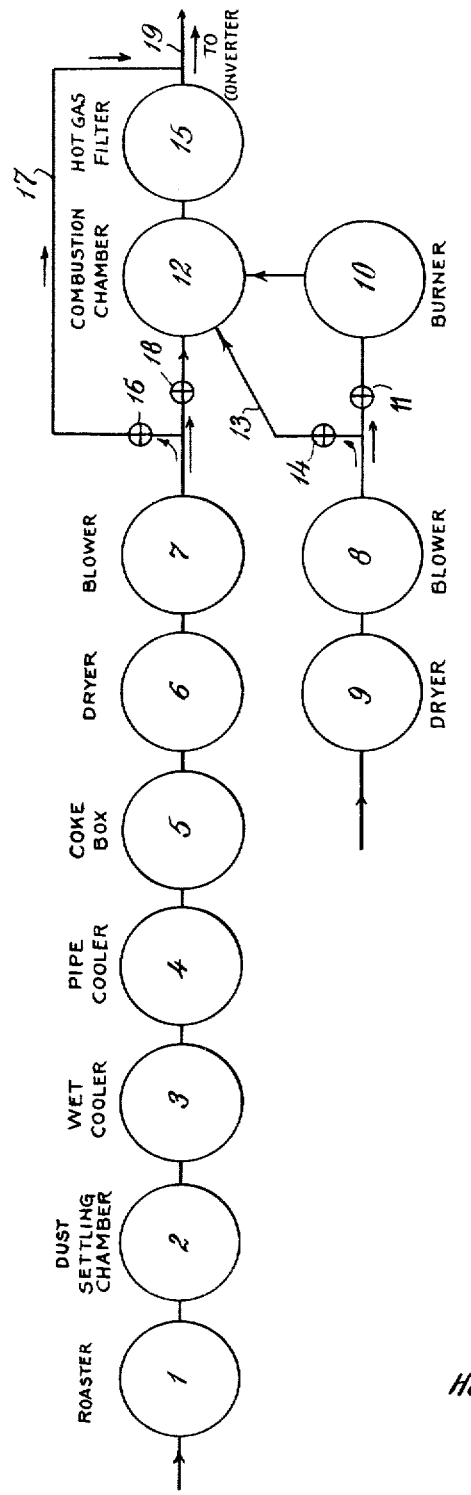
INVENTOR
Henry F. Merriam
BY
Forbes Silsby
ATTORNEY Patented Nov. 26, 1929

1,737,320

UNITED STATES PATENT OFFICE

HENRY F. MERRIAM, OF WEST ORANGE, NEW JERSEY, ASSIGNOR TO GENERAL CHEMICAL COMPANY, OF NEW YORK, N. Y., A CORPORATION OF NEW YORK

CONTACT PROCESS FOR MANUFACTURING SULPHURIC ACID

Application filed December 17, 1927. Serial No. 240,664.

This invention relates to the manufacture of sulphuric acid by the contact process. More particularly the invention relates to an improved method for the production of sulphur dioxide gas suitable for use in the contact process for the manufacture of sulphuric acid.

In manufacturing sulphuric acid by the contact process the sulphur dioxide bearing gas about to contact with the catalyst must satisfy certain conditions of purity, temperature, and composition. The gas must be exceptionally pure, particularly in regard to its content of arsenic, chlorine, sulphuric acid mist, and many other impurities. The gas must be at the proper temperature to cause catalytic action to commence, which temperature, for example, must be in the neighborhood of 750° F. when using platinum as a catalyst. Furthermore, the gas must contain a certain excess of uncombined free oxygen over the amount theoretically required to combine with the sulphur dioxide present. In general, there must be at least 3 to 5% of uncombined oxygen in excess of the amount theoretically required for the transformation of the sulphur dioxide to sulphur trioxide. In addition, it has been found that for most efficient operation the gas should contain approximately 9.5 to 10% of sulphur dioxide.

To attain the required condition of purity of the gas when roasting pyrites ore or when utilizing sulphur dioxide gas produced by smelting various ores containing sulphur, it has been found that the gas must be subjected to an elaborate purification at atmospheric temperatures or slightly above. These temperatures are considerably below the temperature necessary for conversion. This cold purification, which generally comprises washing or scrubbing with weak sulphuric acid or water and intensive filtration through beds of coke or similar materials, is necessary to bring about a thorough purification of the gas from dust, arsenical impurities, chlorine, etc. Upon completion of the purification treatment the gas will be relatively cold, generally having a temperature in the neighborhood of atmospheric temperature This cold gas must then be preheated up to converting temperature before being passed to the catalyst. This preheating requires expensive apparatus in the form of heat exchangers and in many instances necessitates the use of externally supplied heat which adds to the cost of operation of the process.

When utilizing a sulphur bearing ore as a source of sulphur the metal content of the ore, for example iron or copper, will combine with a substantial proportion of the oxygen present in the air used in the roasting operation, with the result that the sulphur dioxide gas produced will be relatively poorer in free oxygen and contain a relatively smaller percentage of sulphur dioxide than if sulphur in the form of brimstone were used as the source of sulphur. Consequently, it is quite difficult and in many cases impossible to produce a strong sulphur dioxide gas containing in the neighborhood of 10% sulphur dioxide by a roasting or smelting operation. Therefore, it is generally impossible to operate contact sulphuric acid systems employing sulphur dioxide obtained from sulphur bearing ores at high efficiency.

On the other hand, when utilizing brimstone of the Louisiana type as a source of sulphur and operating in accordance with the process disclosed in the U. S. patent to Merriam, 1,384,566, the strength of sulphur dioxide in the system may be raised to the highest point possible at which the requisite excess of free oxygen will be present in the gas. When using air as a source of oxygen it can be readily calculated that the highest percentage of sulphur dioxide which may be obtained and still have present 3% excess oxygen over that required for conversion of the dioxide to trioxide, is 12%. This strength is easily obtainable when burning brimstone, and it will be noticed that this strength is greater than that at which most efficient operation is obtained, namely about 10%. Moreover, in the preferred method of operating the Merriam process purification and preheating of the sulphur dioxide gas is dispensed with and the temperature of the gas it not permitted to fall below the converting temperature. In actual practice it is found that a considerable amount of cooling is required to bring the hot sulphur dioxide gases issuing from the sulphur burner down to the converting temperature, and this surplus heat must be disposed of.

In the ordinary operation of the Merriam process provision is made for disposing of excess heat, and in the older cold purification process required for the utilization of relatively impure sulphur dioxide gas provision must be made for preheating the cold purifier gas. Moreover, in the older system it is difficult to obtain high strengths of sulphur dioxide. An object of this invention is to provide a process in which no preheating or cooling by an external agency is required, in which no surplus heat exists or is permitted to be wasted, and which is thus most efficient from the standpoint of heat utilization. A further object is to provide a process in which the strength of sulphur dioxide gas may be maintained relatively strong and at that concentration desired for optimum operating conditions, and which is thus likewise most efficient from the standpoint of strength of sulphur dioxide.

In order to accomplish the above objects, I have developed the present process according to which a stream of gas from a cold purification system is mixed with a stream of hot gas produced by combustion of brimstone, for example, of the Louisiana type, and the proportionate amounts of the two streams are regulated to produce a resulting gas mixture having the proper temperature for conversion and the desired concentration of the sulphur dioxide. By this procedure the necessity for preheating the cold gas by an external agency is avoided and the surplus heat of the hot brimstone gas is efficiently utilized. Furthermore, the relatively weak gas from the cold purification system is strengthened to provide a mixed gas passing to the converters of optimum strength for most efficient operation.

In the accompanying drawing I have diagrammatically illustrated the layout of an apparatus for practicing my invention. Roaster 1 represents any means for producing a relatively impure sulphur dioxide gas such as is obtained by roasting or smelting sulphur bearing ores, and which must be subjected to further purification before it can be passed to a platinum type catalyst without poisoning the catalyst. The gas from roaster 1 will contain substantial amounts of dust, arsenic, chlorine and various other impurities. To purify the gas of these substances, it is passed through a cold purification system comprising a dust settling chamber 2, a wet cooler or scrubber 3, a pipe coler 4, a cokebox 5, and a dryer 6, arranged in the order named. The cold purification apparatus described is given merely by way of example and may be varied in many particulars. However, it may be said in general, and in fact it is well recognized in the contact sulphuric acid art, that proper conditioning of this type of gas necessitates thorough purification at temperatures considerably below that necessary for the subsequent catalytic conversion step.

A blower 7 located after the dryer 6 draws the gas through the purifying apparatus and delivers it under positive pressure for passage to the subsequent converter system. This gas must be preheated to the converting temperature, which for the generally used platinum type catalyst is about 750° F. In accordance with my invention this heating is accomplished by the introduction of controlled amounts of hot brimstone gas.

To provide this hot gas a blower 8 is arranged to supply air preferably previously dried in a dryer 9 by contact, for example, with sulphuric acid, continuously to a sulphur burner or sublimer 10, the flow of air being controlled by valve 11. I prefer to use a type of burner or sublimer which will operate under positive pressure, as the operation is more easily controlled than if the burner is operated under suction. The sulphur fed to the burner should be of sufficient purity that the $SO_2$ gas produced may be passed directly without cold purification to the catalyst employed in the process without poisoning the catalyst, in accordance with the principles of the Merriam patent referred to above. As examples of satisfactory types of brimstone, I may mention Louisiana, Texas or Freeport brimstone. In burner 10 a considerable proportion of the sulphur is sublimed by the heat of combustion of the remaining portion of the sulphur and passes out of the burner in the form of sulphur vapor. To bring about complete combustion of this sulphur vapor the gas is passed into combustion chamber 12 into which additional air as required is introduced through line 13 controlled by valve 14. The function of combustion chamber 12 is thus to completely transform the sulphur in the gas into sulphur dioxide, and of course if no sulphur vapor is present in the gas issuing from burner 10 the combustion chamber may be omitted. However, I prefer to use a type of burner which will sublime or vaporize as large a proportion of the sulphur as possible and thus cause the gas passing to combustion chamber 12 to be as rich as possible in sulphur vapor, as I have found that this method of operation permits me to easily control the strength of sulphur dioxide gas produced.

The gas from the combustion chamber is now preferably passed through a hot gas filter 15 to remove any particles of scale or dust which may be carried over from the combustion chamber or burner. The hot gas filter is not essential but will be found desirable in most commercial installations as a precautionary measure to prevent contamination of the platinum catalyst with dirt. This filter may be composed of asbestos, sulphated ilmenite, crushed quartz, or other material which will withstand high temperatures with disintegration.

The temperature reached in the combustion chamber will be quite high (say, from 1400 to 1500° F.) and far above the proper converting temperature. Ordinarily, when burning Louisiana brimstone and passing the burner gas to the catalyst without cold purification, as disclosed in the Merriam patent referred to above, it is necessary to cool the gas to converting temperature, the heat extracted from the gas being wasted. In my process this cooling is effected by mixing the hot burner gas with the cold gas from the cold purification system, thus simultaneously cooling the hot gas and heating the cold gas without the necessity of either coolers or heaters. To accomplish this result, the cold gas from blower 7 is passed through valve 16 and line 17 (valve 18 being closed) into line 19 carrying the hot brimstone gas from filter 15 to the converter system. The cold gas thus mixes with the hot gas in line 19 and by properly controlling the relative amounts of the two gases the temperature of the resulting mixed gas in line 19 may be closely regulated to give the required temperature of about 7500° F.

As an example of the manner in which my invention may be applied to commercial practice, assume a condition in which an 8% sulphur dioxide gas produced by the combustion of pyrites is being treated in the cold purification system. This strength of gas will contain 9.6% oxygen as an average condition and hence is sufficiently rich in oxygen to give more than the required excess of 3%. The temperature of the gas following the blower will be in the neighborhood of 100° F. and must be raised to 750° F. before passage to the converters, a temperature rise of 650° F. Moreover, the strength of sulphus dioxide must be increased 2% for most efficient operation.

To accomplish this, the brimstone burner is operated to produce a 12% sulphur dioxide gas in combustion chamber 12. With this strength of gas, the temperature reached in the combustion chamber will be quite high, and as an example of good operating conditions may be assumed to be 1500° F. This temperature will drop about 100° F. as the gas passes through the hot gas filter, the temperature drop depending upon the design of filter, type of filtering material used, and the amount of heat lost from the gas by radiation in passing through the line connecting the combustion chamber and filter. This will result in a temperature of about 1400° F. in the hot brimstone gas leaving the filter. This temperature is 650° F. above the converting temperature.

A sufficient amount of this hot gas must be mixed with the cold gas to give a resulting mixture at 750° F. In the present case, the required rise in temperature of the cold gas is equal to the required drop in temperature of the hot gas, so that approximately equal amounts by weight of the two gases must be mixed. Accordingly, blower 8 is regulated to supply an amount of hot gas approximately equal to the amount of cold gas coming from the cold purification system, and the mixed gas in line 19 will then have a temperature of approximately 750° F. Moreover, the mixed gas will be found to contain the desired concentration of 10% sulphur dioxide.

The actual temperature conditions prevailing in any given system will depend upon the particular layout and type of apparatus used in the system, and will vary considerably with different systems, but in any case the relative amounts of the two gas streams to be mixed to produce whatever temperature and strength of sulphur dioxide is desired in the resulting mixture can readily be determined by calculation or by trial. The total amount of hot gas can be easily controlled by regulating the speed of blower 8, and the strength of the hot gas is readily varied controlling valve 14 to admit more or less supplementary air to the combustion chamber. Consequently, the process is capable of close control and admits of ready variation to take care of changes in operating conditions.

In some cases, for instance when employing a relatively weak gas from the roasting of pyrrhotite ores, it will be found that when a sufficient amount of hot gas is mixed with the cold gas to give a resulting desired temperature, the sulphur dioxide content of the mixture is not as high as desired. Under these circumstances, it is necessary to produce a hot gas containing over 12% sulphur dioxide or to permit the temperature of the hot gas to drop considerably prior to mixing same with the cold gas. The latter procedure will then permit an additional amount of the rich gas to be mixed with the relatively weak cold gas. The former procedure is readily accomplished by decreasing the amount of air entering the combustion chamber through valve 14. In this manner the sulphur dioxide content of the hot gas may be increased materially over 12%. As previously explained, when the sulphur dioxide content is increased over 12%, the gas will then be deficient in free oxygen in that it will contain less than 3% free oxygen. For this reason, this method of operation can be employed only when the cold gas contains more than the required 3% excess of free oxygen.

As an example of this method of operation, assume a condition in which a 6.5% sulphur dioxide gas obtained by roasting pyrrhotite ore is being treated in the cold purification system. This gas will contain as an average condition 9% free oxygen, which is 2.75% more than the amount required for formation of sulphur trioxide plus 3% excess. To raise the temperature of this gas to converting temperature and simultaneously raise the sulphur dioxide content to 10%, the brimstone burner should be operated to produce a 13.5% sulphur dioxide gas in combustion chamber 12. This gas will contain 7.5% free oxygen and is thus 1.5% deficient in oxygen. Assuming again a temperature of 100° F. in the cold gas leaving the blower and a temperature of 1400° F. in the hot gas leaving the filter, by mixing approximately equal amounts by weight of the two gas streams a resulting temperature of 750° F. will be obtained. The mixture will be found to contain the desired concentration of 10% sulphur dioxide together with slightly more than the amount of free oxygen required to give 3% excess oxygen. In this example, the sulphur dioxide content of the cold gas has been enriched due to the excess sulphur dioxide present in the hot gas, and the deficiency in oxygen of the hot gas has been supplied by the excess oxygen present in the cold gas.

Whenever the cold gas contains an excess of oxygen, as in the example just given, it may be found desirable to pass the cold gas directly into combustion chamber 12 by opening valve 18 rather than to bypass the cold gas through valve 16 and line 17. By operating in this manner, combustion of the sulphur vapor passing into combustion chamber 12 from burner 9 is aided by the excess oxygen present in the cold gas. The mixing of the two streams will take place in combustion chamber 12 rather than in line 19. The temperature of the mixed gas will be somewhat lower due to the influx of cold gas and under some circumstances this may be desirable as it will result in lower temperatures in the gas lines and in hot gas filter 15. A further desirable feature of this method of operation is that a portion of the sublimed elemental sulphur vapor passing into combustion chamber 12 will be oxidized by the excess free oxygen of the cold purified gas rather than by air introduced through blower 8. This is an advantage in that enrichment of the cold gas is thereby effected in part at least without introducing diluting nitrogen into the system. Such method of operation possesses the disadvantage, however, of increasing the size of the combustion chamber and hot gas filter to accommodate the increased volume of gas necessary to be handled.

I desire it to be understood that the applications of my invention described above are by way of example only and that various modifications may be made without departing from the spirit of the invention. In some cases, it may be desirable to permit the temperature of the hot brimstone gas to drop considerably before entering the hot gas filter in order to permit the use of a particular type of filtering material incapable of withstanding the maximum temperature possible of being produced. In this situation, a portion only of the excess heat of the hot gas would be utilized. Again, the invention may be made use of in connection with a cold purification system employing preheating of the cold gas to converting temperature by known preheating methods rather than by heat derived from the hot relatively pure gas, the primary object in this case being to enrich the relatively weak cold gas in sulphur dioxide. The advantage of this method of operation is that the expensive and complicated cold purification system need be made only of sufficient size to accommodate the relatively impure gas produced in the roasting operation. The relatively pure brimstone gas, rich in sulphur dioxide and after proper cooling, is then introduced into the system immediately preceding the converters to thereby raise the sulphur dioxide content of the cold purified gas to the amount desired.

As used herein, the expression "relatively impure gas" refers to a gas which contains impurities of such character and in such quantities that they must be removed by a cold purification treatment to prevent poisoning of the contact material. Likewise, the term "relatively pure gas" refers to a gas such as is produced by burning sulphur of the Louisiana brimstone type which does not require cold purification and may be passed directly to the catalyst without resulting in poisoning.

I claim:

1. The improvement in the method of manufacturing sulphuric acid by the contact process which comprises subjecting a relatively impure sulphur dioxide gas to a cold purification treatment, and mixing therewith, following the purification step, a stream of relatively pure sulphur dioxide gas.

2. The improvement in the method of manufacturing sulphuric acid by the contact process which comprises subjecting a relatively impure sulphur dioxide gas to a cold purification treatment, and mixing therewith, following the purification step, a stream of relatively pure gas obtained by the combustion of sulphur of the Louisiana brimstone type.

3. The process of producing sulphur dioxide containing gas which comprises subjecting a relatively impure sulphur dioxide gas to a cold purification treatment, and then enriching said gas in sulphur dioxide content by mixing therewith a stream of relatively pure gas containing an amount of sulphur dioxide greater than that in said purified gas.

4. The process of producing sulphur dioxide containing gas having a temperature materially above atmospheric temperature which comprises subjecting a relatively impure sulphur dioxide gas to a cold purification treatment, and then mixing with the purified gas a stream of relatively pure gas having a temperature materially greater than that of said purified gas.

5. The improvement in the contact sulphuric acid process employing cold purification of relatively impure sulphur dioxide gas, which comprises the step of enriching said gas in sulphur dioxide content by mixing therewith, following the purification step, a stream of relatively pure gas containing an amount of sulphur dioxide greater than that in said purified gas.

6. The improvement in the contact sulphuric acid process employing cold purification of relatively impure sulphur dioxide gas, which comprises the step of raising the temperature of said gas by mixing therewith, following the purification step, a stream of relatively pure gas having a temperature materially greater than that of said purified gas.

7. The improvement in the method of manufacturing sulphuric acid by the contact process which comprises the steps of producing a relatively impure sulphur dioxide gas, subjecting said gas to a cold purification treatment, whereby a purified gas is produced having a temperature materially below converting temperature, producing by combustion of sulphur of the Louisiana brimstone type a relatively pure hot sulphur dioxide gas having a temperature materially above converting temperature and richer in sulphur dioxide than said purified gas, and mixing said relatively pure hot gas in controlled proportions with said cold purified gas to produce a resulting gas mixture richer in sulphur dioxide and having a higher temperature than said purified gas.

8. The method of manufacturing sulphuric acid by the contact process, which comprises producing a relatively impure sulphur dioxide gas, subjecting said gas to a cold purification treatment, whereby a purified gas is produced having a temperature materially below converting temperature, producing by combustion of sulphur of the Louisiana brimstone type a relatively pure hot sulphur dioxide gas having a temperature materially above converting temperature, mixing said relatively pure hot gas with said cold purified gas in controlled proportions to produce in the mixture a predetermined temperature suitable for the subsequent conversion step, and then converting the sulphur dioxide to trioxide by catalytic oxidation.

9. The method of manufacturing sulphuric acid by the contact process, which comprises producing a relatively impure sulphur dioxide gas, subjecting said gas to a cold purification treatment, whereby a purified gas is produced having a temperature materially below converting temperature, producing by combustion of sulphur of the Louisiana brimstone type a relatively pure hot sulphur dioxide gas having a temperature materially above converting temperature and richer in sulphur dioxide than said purified gas, mixing said relatively pure hot gas with said cold purified gas in controlled proportions to produce a mixture of predetermined sulphur dioxide content and at a predetermined temperature suitable for the subsequent conversion step, and then converting the sulphur dioxide to trioxide by catalytic oxidation.

10. The method of manufacturing sulphuric acid by the contact process, which comprises producing a relatively impure sulphur dioxide gas, subjecting said gas to a cold purification treatment, whereby a purified gas is produced having a temperature materially below converting temperature, producing by combustion of sulphur of the Louisiana brimstone type a relatively pure hot sulphur dioxide gas having a temperature materially above converting temperature, mixing said relatively pure hot gas with said cold purified gas in controlled proportions to produce a mixture having a predetermined temperature suitable for the subsequent conversion step, regulating the sulphur dioxide and oxygen content of the brimstone gas with respect to the sulphur dioxide and oxygen content of the cold purified gas to provide predetermined amounts of sulphur dioxide and oxygen in the mixture, and then converting the sulphur dioxide to trioxide by catalytic oxidation.

11. The method of manufacturing sulphuric acid by the contact process, which comprises the steps of producing a relatively impure sulphur dioxide gas, subjecting said gas to a cold purification treatment, whereby a purified gas is produced having a temperature materially below converting temperature, producing by combustion of sulphur of the Louisiana brimstone type a relatively pure hot sulphur dioxide gas having a temperature materially above converting temperature, utilizing the excess heat of the hot gas to raise the temperature of the cold gas to converting temperature, while simultaneously lowering the temperature of the hot gas to converting temperature, and converting the sulphur dioxide to trioxide by catalytic oxidation.

12. The improvement in the method of manufacturing sulphuric acid by the contact process which comprises subjecting a relatively impure sulphur dioxide gas to a cold purifiication treatment, and, following the purification treatment, contacting the gas in the presence of free oxygen with elemental sulphur and causing said sulphur to react with said free oxygen to thereby enrich said gas in sulphur dioxide content.

13. The improvement in the method of manufacturing sulphuric acid by the contact process which comprises subjecting a relatively impure sulphur dioxide gas to a cold purification treatment, and, following the purification treatment, mixing the gas in the presence of free oxygen with elemental sulphur vapor and causing said sulphur vapor to react with said free oxygen to thereby enrich said gas in sulphur dioxide content.

14. The improvement in the method of manufacturing sulphuric acid by the contact process which comprises subjecting a relatively impure sulphur dioxide gas to a cold purification treatment, and following the purification treatment, contacting the gas in the presence of free oxygen with elemental sulphur of the Louisiana type to thereby enrich said gas in sulphur dioxide content.

In testimony whereof, I affix my signature.

HENRY F. MERRIAM.

CERTIFICATE OF CORRECTION.

Patent No. 1,737,320.   Granted November 26, 1929, to

HENRY F. MERRIAM.

It is hereby certified that error appears in the printed specification of the above numbered patent requiring correction as follows: Page 2, line 62, for the misspelled word "coler" read "cooler"; page 3, line 6, for the word "with" read "without"; same page, line 32, for "7500°" read "750°"; line 46, for "sulphus" read "sulphur", and line 95, after the word "varied" insert the word "by"; page 6, line 18, claim 14, after the word "type" insert the words "and causing said sulfur to react with said free oxygen"; and that the said Letters Patent should be read with these corrections therein that the same may conform to the record of the case in the Patent Office.

Signed and sealed this 7th day of January, A. D. 1930.

(Seal)

M. J. Moore,
Acting Commissioner of Patents.

13. The improvement in the method of manufacturing sulphuric acid by the contact process which comprises subjecting a relatively impure sulphur dioxide gas to a cold purification treatment, and, following the purification treatment, mixing the gas in the presence of free oxygen with elemental sulphur vapor and causing said sulphur vapor to react with said free oxygen to thereby enrich said gas in sulphur dioxide content.

14. The improvement in the method of manufacturing sulphuric acid by the contact process which comprises subjecting a relatively impure sulphur dioxide gas to a cold purification treatment, and following the purification treatment, contacting the gas in the presence of free oxygen with elemental sulphur of the Louisiana type to thereby enrich said gas in sulphur dioxide content.

In testimony whereof, I affix my signature.

HENRY F. MERRIAM.

CERTIFICATE OF CORRECTION.

Patent No. 1,737,320.    Granted November 26, 1929, to

HENRY F. MERRIAM.

It is hereby certified that error appears in the printed specification of the above numbered patent requiring correction as follows: Page 2, line 62, for the misspelled word "coler" read "cooler"; page 3, line 6, for the word "with" read "without"; same page, line 32, for "7500°" read "750°"; line 46, for "sulphus" read "sulphur", and line 95, after the word "varied" insert the word "by"; page 6, line 18, claim 14, after the word "type" insert the words "and causing said sulfur to react with said free oxygen"; and that the said Letters Patent should be read with these corrections therein that the same may conform to the record of the case in the Patent Office.

Signed and sealed this 7th day of January, A. D. 1930.

(Seal)

M. J. Moore,
Acting Commissioner of Patents.